(12) United States Patent
Bonn

(10) Patent No.: US 6,618,755 B1
(45) Date of Patent: Sep. 9, 2003

(54) AUTOMATICALLY IDENTIFYING SUBNETWORKS IN A NETWORK

(75) Inventor: David Wayne Bonn, Everett, WA (US)

(73) Assignee: WatchGuard Technologies, Inc., Seattle, WA (US)

( * ) Notice: Subject to any disclaimer, the term of this patent is extended or adjusted under 35 U.S.C. 154(b) by 0 days.

(21) Appl. No.: 09/457,442

(22) Filed: Dec. 7, 1999

(51) Int. Cl.$^7$ ............................................. G06F 15/173
(52) U.S. Cl. ...................... 709/223; 709/220; 709/224; 709/217; 370/254; 370/255; 370/256
(58) Field of Search .......................... 709/223; 370/254, 370/351

(56) References Cited

U.S. PATENT DOCUMENTS

| | | | | |
|---|---|---|---|---|
| 6,003,074 A | * | 12/1999 | Vasconcellos | ............... 370/254 |
| 6,377,987 B1 | * | 4/2002 | Kracht | ........................ 370/254 |
| 6,385,649 B1 | * | 5/2002 | Draves et al. | .............. 370/392 |

FOREIGN PATENT DOCUMENTS

| | | |
|---|---|---|
| WO | WO98/18306 | 5/1998 |
| WO | WO99/49474 | 9/1999 |

OTHER PUBLICATIONS

Hwa–Chun–Lin et al., "An Algorithm for Automatic Topology Discovery of IP Networks" 1998 IEEE International Conference on Communications, Vonference Record, New Century Communications Atlanta, GA, Jun. 7–11, 1998, NY, NY, Jun. 7, 1998.*

Hwa–Chun Lin et al., "An Algorithm for Automatic Topology Discovery of IP Networks," 1998 IEEE International Conference on Communications, Conference Record, New Century Communications, Atlanta, Georgia, Jun. 7–11, 1998, International Conference on Communications, New York, New York, Jun. 7, 1998.

* cited by examiner

Primary Examiner—Dung C. Dinh
Assistant Examiner—Kevin Parton
(74) Attorney, Agent, or Firm—Perkins Coie LLP

(57) ABSTRACT

A software facility for automatically identifying subnetworks in a network is described. The facility receives a plurality of addresses of hosts in the network, and accesses a binary tree. The nodes of the binary tree each represent a range of addresses within the network. A facility traverses the binary tree to identify candidate nodes where both child nodes have one or more descendent leaf nodes representing host addresses. The facility tests the address range represented by each candidate node visited in the traversal to determine whether the address range is a subnet address range for a subnet being used on the network. If testing indicates that a visited candidate node represents such an address range, the facility identifies the visited candidate node as a subnet node. The facility skips, in the traversal, any candidate notes that are descendents of an identified subnet node.

16 Claims, 6 Drawing Sheets

AUTOMATICALLY IDENTIFYING SUBNETWORKS IN A NETWORK

TECHNICAL FIELD

The present invention is directed to the field of computer networking, and more particularly, to the field of network configuration.

BACKGROUND

Computer networks connect computer systems and other network devices, collectively called "nodes" or "hosts," in a manner that enables them to exchange data. While many networks are composed of wired connections, the term "network" also describes wireless networks of various sorts. Nodes in the same network are typically each identified using a network address that is unique within the network.

A network may host one or more logical networks, which are also referred to as "subnetworks" (or "subnets") of the network. Subnets are defined by the subset of all possible network addresses that they contain. In a network having subnets, the network addresses of the nodes are said to contain two components, or "parts": a "network part" identifying the particular subnetwork of which the node is a member, whose contents are invariant across the network addresses of the nodes of a particular subnetwork, and a "host part" identifying the particular node within the subnetwork.

The amount of space in the network addresses of nodes in a particular subnet needed for the host part varies with the number of nodes in the subnetwork, as more space is required to uniquely identify larger numbers of nodes. Accordingly, many addressing schemes allow the size of the host part of the network address, and, correspondingly, the size of the network part to vary from subnet to subnet.

In many situations, it is useful to identify any subnets operating on a given network. This information is often needed when adding a new node, such as a network security device or a router, to the network, or when configuring an existing node within the network.

In general, identifying a subnet involves both (1) identifying the portion of network addresses of the subnet that is devoted to the network part, and (2) determining the content of the network part. To identify the subnets of a particular network, it is common for a network specialist to physically visit and interrogate one or more nodes of the network. This approach is both expensive and time-consuming, as it requires the physical presence of a scarce network specialist.

In view of the foregoing, a facility for automatically identifying subnets in a network would have significant utility.

DETAILED DESCRIPTION

Figure 1:
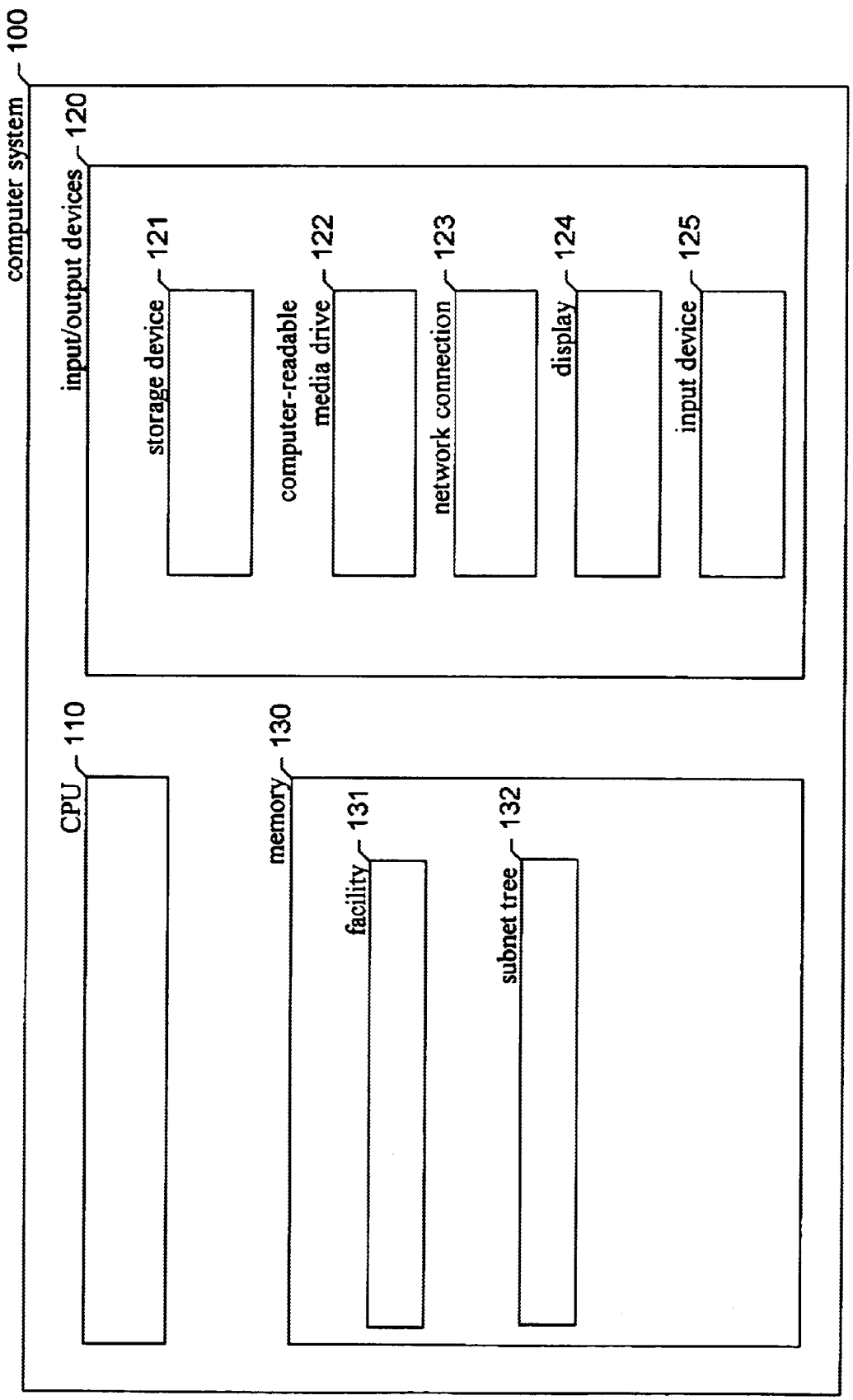
FIG. 1 is a high-level block diagram of the computer system upon which the facility preferably executes.

A software facility for automatically identifying subnetworks ("the facility") is provided. The facility preferably operates in a computer system or other device that protects a group of protected computer systems from unauthorized packets, but may operate in other types of temporary or permanent network nodes.

In a preferred embodiment, the facility first identifies the network addresses of hosts in the network. From the list of identified host addresses, the facility constructs a tree representing the network. As this tree also represents all possible subnets that might exist within the network, it is referred to as a "subnet tree." The facility preferably performs a preorder traversal of this tree, testing possible subnets that are visited in the traversal to determine whether they constitute actual subnets in use in the network.

The facility preferably tests each possible subnet by first determining whether either of the two "central" addresses in the center of the range of addresses corresponding to the possible subnet has been identified as a host address. If so, the facility identifies the possible subnet as an actual subnet, and ignores any possible subnets having address ranges that are subranges of the address range of the actual subnet. This test is based on a common practice of reserving the largest and smallest addresses in a subnet's address range from assignment to a host: the host having the central address must be included in some subnet, but since the central address of the current range is the largest or smallest address of any subranges of the current range, the host having the central address cannot be included in any subnet having an address range that is a subrange of the current range. Because the traversal order of the tree has ruled out any possible subnets that have address ranges that are superranges of the current range, the host having the central address must be included in the current potential subnet. This test has the advantage that it is very inexpensive to perform.

If neither of the two central addresses in the range of addresses corresponding to the possible subnet has been identified as a host address, the facility next sends a number of test packets to identified host addresses within the range. Each test message requests a reply, and has a source address that is in the opposite half of the address range from the destination address. If more than a threshold percentage of hosts that receive test messages reply directly to the source address of the test message in the other half of the address range, the facility identifies the possible subnet as an actual subnet, and ignores any possible subnets having address ranges that are subranges of the address range of the actual subnet. Otherwise, the facility proceeds to test any possible subnets having address ranges that are subranges of the address range of the current possible subnet. This test is based on the practice of transmitting packets directly to destination addresses within the same subnet, but forwarding packets having destination addresses within a different subnet to a router for delivery. This test has the advantage that it is effective to identify most actual subnets.

By analyzing a network in this fashion, the facility can accurately and automatically identify subnets operating within the network. For this reason, the facility makes it possible to automatically configure devices within the network such as routers and network security devices, without requiring the expensive and time-consuming manual intervention of a network security expert.

While the facility preferably operates with a variety of existing and future network addressing schemes, its specific implementation is discussed herein with respect to the Internet Protocol network addressing scheme. To facilitate this discussion, Internet Protocol addressing is described briefly.

Version 4 of the Internet Protocol standard ("IPv4") specifies that numerical network addresses in an IP network ("IP addresses") are unsigned 32-bit integers, made up of 4 8-bit bytes. (In version 6, or "IPv6," IP addresses are unsigned 128-bit integers.) IP addresses are commonly expressed in what is called "dotted decimal notation," in which the bytes are shown as decimal integers separated by decimal points. An example of an IP address in dotted decimal notation is shown on line (1):

208.152.24.18  (1)

IP addresses may also be expressed in hexadecimal or binary form. Line (2) shows the same example IP address in hexadecimal form, while line (3) shows the same IP address in binary form:

D0 98 18 12  (2)

11010000 10011000 00011000 00010010  (3)

Subnets are generally defined based upon a range of network addresses all beginning with the same address prefix. For example, one range of addresses that may correspond to a possible subnet containing the address shown on lines (1)–(3) is shown in dotted decimal, hexadecimal, and binary forms on lines (4), (5) and (6), respectively.

208.144.0.0–208.159.255.255  (4)

D0 90 00 00–D0 9F FF FF  (5)

11010000 10010000 00000000 00000000–11010000 10011111 11111111 11111111  (6)

The addresses in the address ranges shown on lines (4) (5), and (6) are said to share the address prefix shown on line (7) in binary form.

11010000 1001  (7)

A range of addresses making up a subnet may also be expressed using a "slash" notation in which the smallest address of the range, in dotted decimal notation, is followed by a slash, then by the number of binary digits in the prefix. For example, line (8) below contains an expression of the ranges shown on lines (4), (5), and (6) in slash notation.

208.144.0.0/12  (8)

FIG. 1 is a high-level block diagram of the computer system upon which the facility preferably executes. The computer system 100 contains one or more central processing units (CPUs) 110, input/output devices 120, and a computer memory (memory) 130. Among the input/output devices is a storage device 121, such as a hard disk drive, and a computer-readable media drive 122, which can be used to install software products, including components of the facility, which are provided on a computer-readable medium, such as a CD-ROM. The input/output devices also include a network connection 123, through which the computer system 100 may by connected to the network to be analyzed by the facility. The memory 130 preferably contains the subnetwork identification facility 131, as well as a subnet tree 132 generated and used by the facility. While the facility is preferably implemented on a computer system configured as described above, those skilled in the art will recognize that it may also be implemented on computer systems having different configurations. In particular, the facility may be implemented in a dedicated network security device, a dedicated network analysis device, a router, or other types of specialized hardware.

Figure 2:
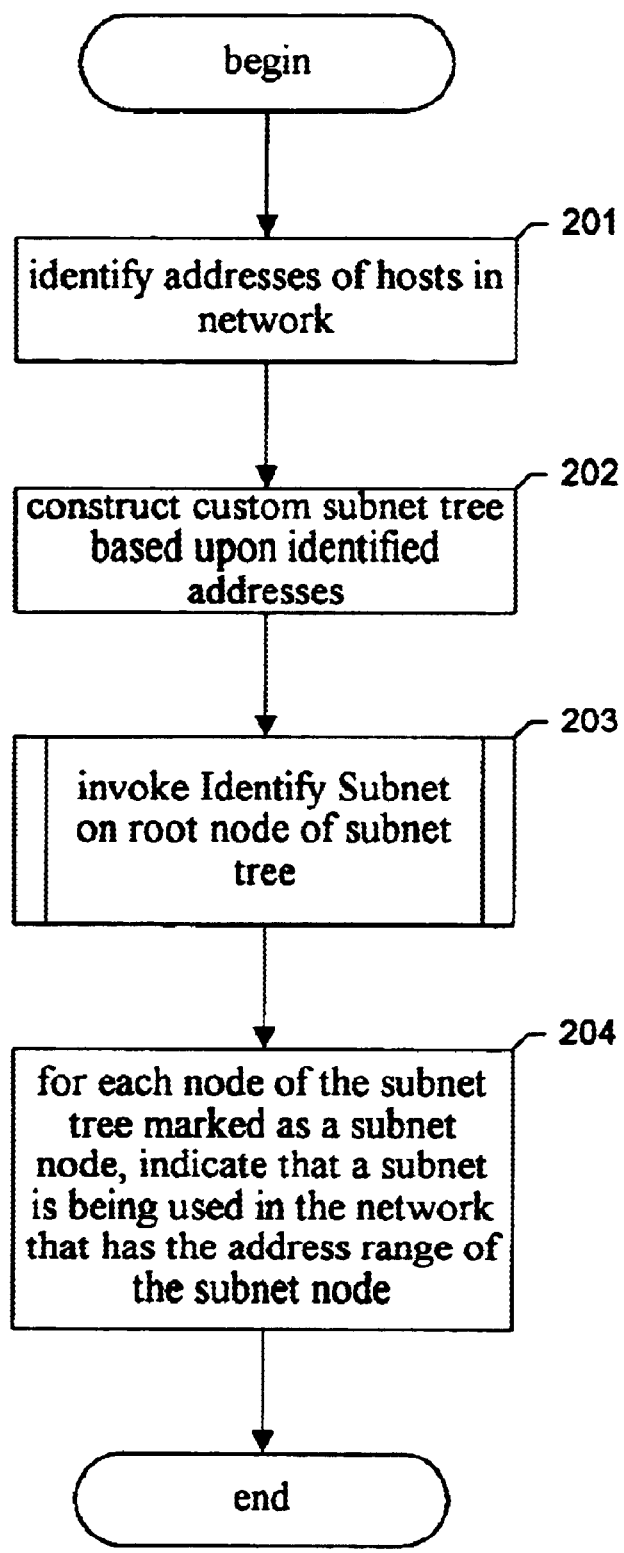
FIG. 2 is a flow diagram showing the steps preferably performed by the facility in order to identify the subnets being used in a network.

FIG. 2 is a flow diagram showing the steps preferably performed by the facility in order to identify the subnets being used in a network. In step 201, the facility identifies the network addresses of hosts (computer systems and other network nodes) within the network. The facility preferably uses a number of techniques to identify host addresses including (a) listening passively to the packets exchanged on the network and obtaining host network addresses from their source and destination address fields; (b) generating broadcast requests designed to elicit responses from the hosts that receive them, including broadcast pings and broadcast UDP echoes, and collecting the source addresses from the responses; (c) sending a Dynamic Host Configuration Protocol request, and collecting IP addresses from the responses; and (e) performing Address Resolution Protocol scanning for addresses close to (e.g., those having the same 24-bit address prefix as) host addresses detected in other ways. Those skilled in the art will recognize that additional host address identification techniques could easily be incorporated in step 201.

In step 202, the facility constructs a custom subnet tree based upon the identified host addresses. A sample subnet tree constructed by the facility in step 202, discussed in greater detail below, is shown in FIG. 4. In step 203, the facility invokes an IdentifySubnet routine on the root note of the subnet tree. As is discussed in greater detail below in conjunction with FIG. 3, the IdentifySubnet routine recursively invokes itself to identify any subnets being operated in the network. The call to the IdentifySubnet routine in step 203 returns when this process is complete. At this point, the nodes of the subnet tree corresponding to the identified subnets are marked as subnet nodes. In step 204, the facility, for each node of the subnet tree marked as a subnet node, indicates that a subnet is being used in the network that has the address range of the subnet node. After step 204, the steps conclude.

Figure 3:
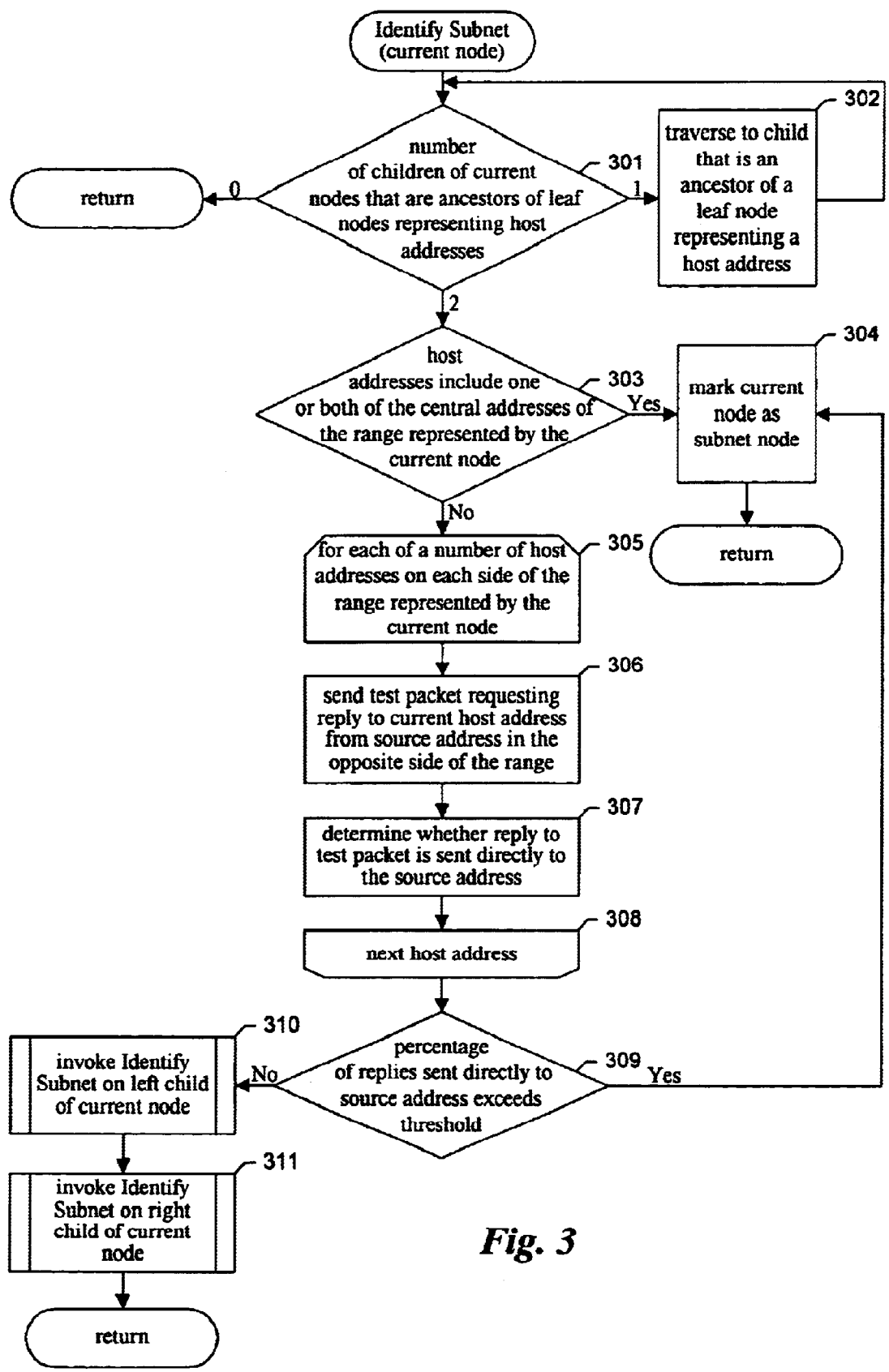
FIG. 3 is a flow diagram showing the steps preferably performed by the facility in the IdentifySubnet routine.
Figure 4:
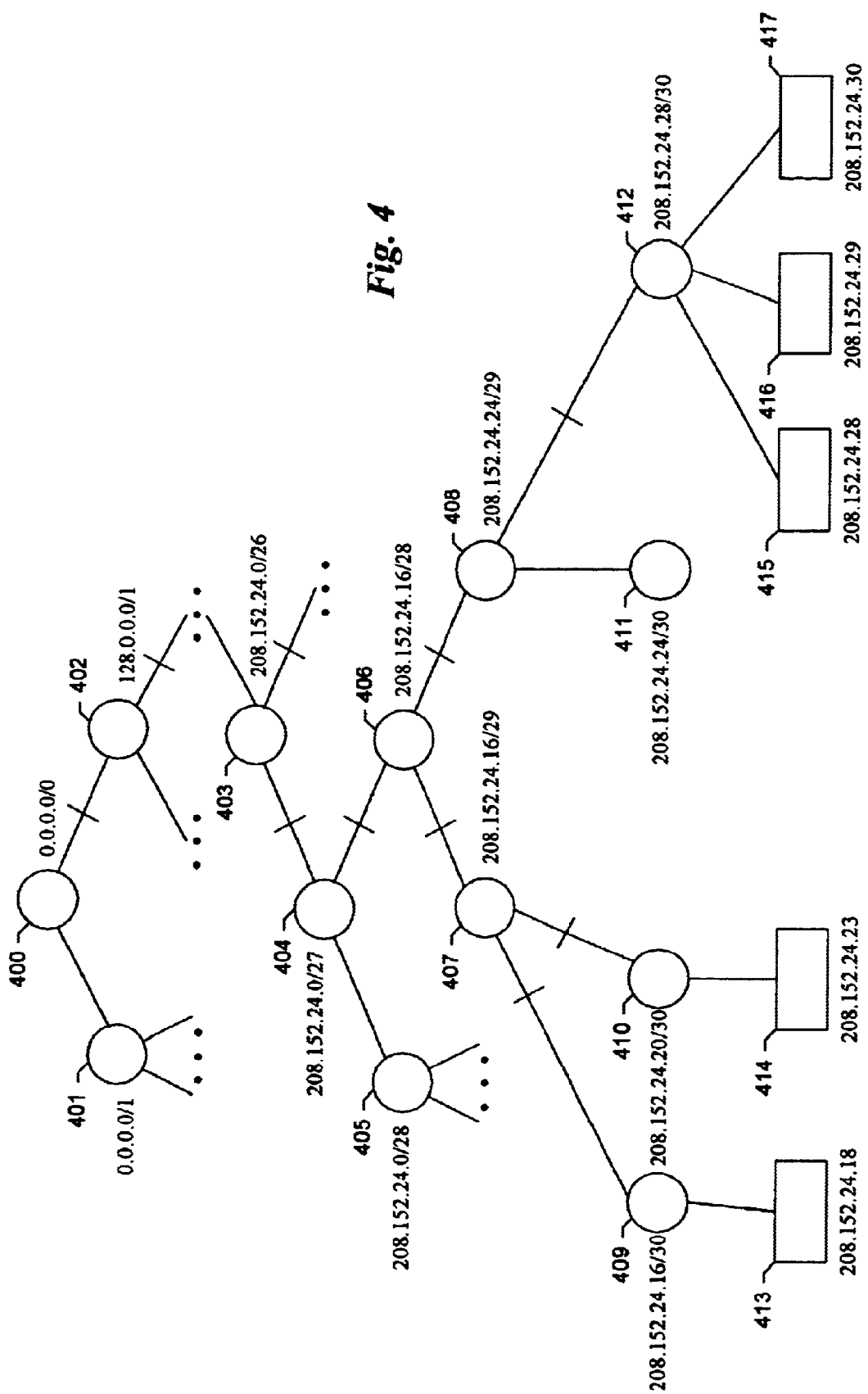
FIG. 4 is a data structure diagram showing a sample subnet tree.

FIG. 3 is a flow diagram showing the steps preferably performed by the facility in the IdentifySubnet routine. The IdentifySubnet routine receives a parameter identifying a "current node" of the subnet tree in which analyses is to begin. In the first invocation of the IdentifySubnet routine, the parameter identifies the root node of the subnet tree. In subsequent invocations, the parameter identifies nodes that are descendents of the root node.

In step 301, the facility determines the number of children of the current node that are ancestors of leaf nodes representing host addresses. If this number is 0, then the facility returns. If this number is 1, then the facility continues in step 301, and if this number is 2, then the facility continues in step 303. In step 302, the facility traverses from the current node to the one child of the current node that is an ancestor of a leaf node representing a host address. This child node becomes the new current node. After step 302, the facility continues in step 301. In step 303, if the host addresses include one or both of the central addresses of the range represented by the current node, then the facility continues in step 304, else the facility continues in step 305. In step 304, the facility marks the current node as a subnet node and returns. In steps 305–308, the facility loops through each of a number of host addresses on each "side," or contiguous half, of the range represented by the current node. In step 306, the facility sends a test packet requesting a reply to the current host address from a source address in the opposite side of the range. While the facility preferably sends a UDP echo packet to port 7 of the host or a UDP packet to port 12345 of the host, other packets designed to generate replies may be substituted. In step 307, the facility determines whether a reply to the test packet sent in step 306 is sent directly from the host to the source address of the test packet. In step 308, if additional host addresses remain, the facility loops back to step 305 to process the next host address. In step 309, if the percentage of replies sent directly to the source address exceeds a predetermined threshold, such as 80%, then the facility continues in step 304 to mark the current node as a subnet node, else the facility continues in step 310. In steps 310 and 311, the facility invokes the IdentifySubnet routine on the left and right children, respectively, of the current node. After step 311, the steps conclude.

FIG. 4 is a data structure diagram showing a sample subnet tree. The subnet tree is constructed of nodes, which include a root node 400, shown as a double-circle; intermediate nodes, such as nodes 401–412, shown as single circles, and leaf nodes, such as nodes 413–417, shown as boxes. Each leaf node represents a host address identified in the network. For example, leaf node 413 represents the host address 208.152.24.18. Each intermediate node represents a subarrange of the entire network address range. For example, intermediate node 409, labeled in slash notation with "208.152.24.16/30", represents the address range 208.152.24.16–208.152.24.19. The root node 400, labeled in slash notation with "0.0.0.0/0", represents the entire network address range—that is, the range from "0.0.0.0–255.255.255.255." While the subnet tree maybe a complete binary tree in which the root node and all the intermediate nodes have two children, the facility preferably "trims" the tree to remove leaf nodes for addresses that are not host addresses and intermediate nodes that are not ancestors of leaf nodes representing a host address. Also, because it is generally impossible to have a subnet with as few as two nodes, the intermediate nodes at depth 31 are omitted, such that the leaf nodes representing host addresses are all children of intermediate nodes at depth 30. For example, leaf nodes 415, 416, and 417 are all children of intermediate node 412 at depth 30.

In addition to omitting trimmed nodes that are not ancestors of leaf nodes representing host addresses, the subnet tree shown in FIG. 4 also omits additional nodes because of space considerations, including nodes occurring between nodes 402 and 403 at depths between 2 and 25, and some of the nodes descending from node 403.

In analyzing the network, the facility traverses the subnet tree to visit nodes having two children that are ancestors of leaf nodes representing host addresses. In the example subtree, the first such node encountered in traversing from the root node 400 is node 403, both of whose children are ancestors of leaf nodes representing host addresses, as indicated by the hash marks on the line segments connecting node 403 to its children. In the example, testing of node 403 fails to identify node 403 as a subnet node. At this point, the facility traverses from node 403 to node 406, which also has two children that are both ancestors of leaf nodes representing host addresses. In applying the first test to node 406, the facility determines whether the central addresses in the range of node 406 are occupied with host addresses.

Figure 5:
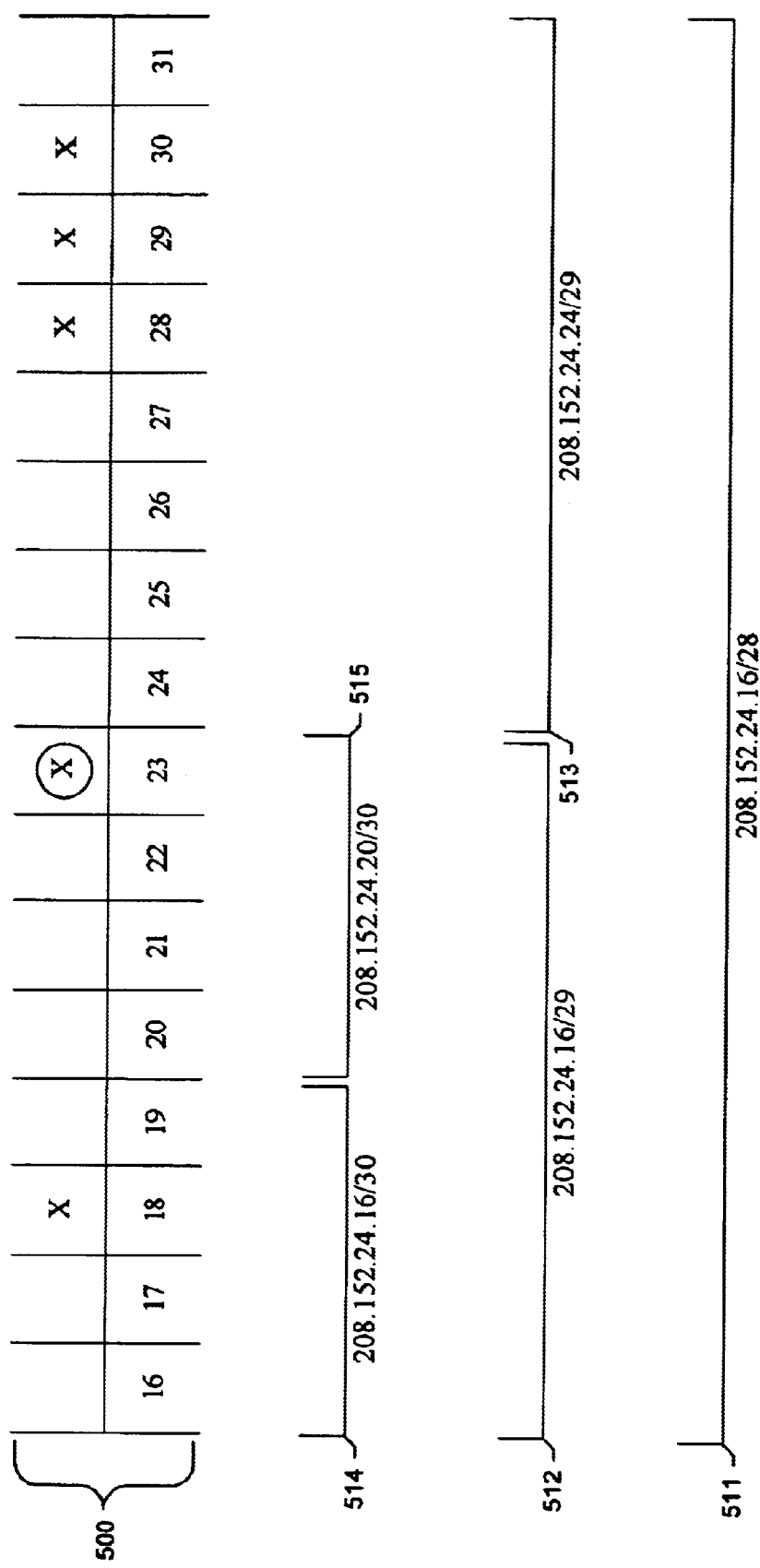
FIG. 5 is a network address diagram showing the addresses in the range of node 406 shown in FIG. 4.

FIG. 5 is a network address diagram showing the addresses in the range of node 406 shown in FIG. 4. Table 500 in FIG. 5 shows that, in the address range of node 406 of 208.152.24.16–208.152.24.31, the following addresses are host addresses:

208.152.24.18

208.152.24.23

208.152.24.28

208.152.24.29

208.152.24.30

Of the central addresses of this range—208.152.24.23 and 208.154.24.24–208.152.24.16.23 is a host address. The facility therefore identifies node 406 as a subnet node. After marking node 406 as a subnet node, the facility retreats to node 403 and traverses down its right branch to the next possible subnet node.

To further explicate the basis for this outcome, subranges 511–515 are shown. Of these subranges, subrange 511 corresponds to node 406, subrange 512 corresponds to node 407, subrange 513 corresponds to node 408, subrange 514 corresponds to node 409 and subrange 515 corresponds to node 410. Above, the facility determined that a subnet is operating in subrange 511 corresponding to node 406 based on the central address 208.152.24.23 being a host address as shown by the circle in table 500. Because no subnet has yet been identified for a range that is a superrange of range 511, the host address 208.152.24.23 must be in a subnet utilizing either range 511, range 512, or range 515. Because the address 208.152.24.23 is the largest address in ranges 512 and 515, however, it cannot be in a subnet operating in either of those ranges, because the largest address in a subnet range generally may not be assigned to a host. This address, therefore, must be part of a subnet using range 511.

Figure 6:
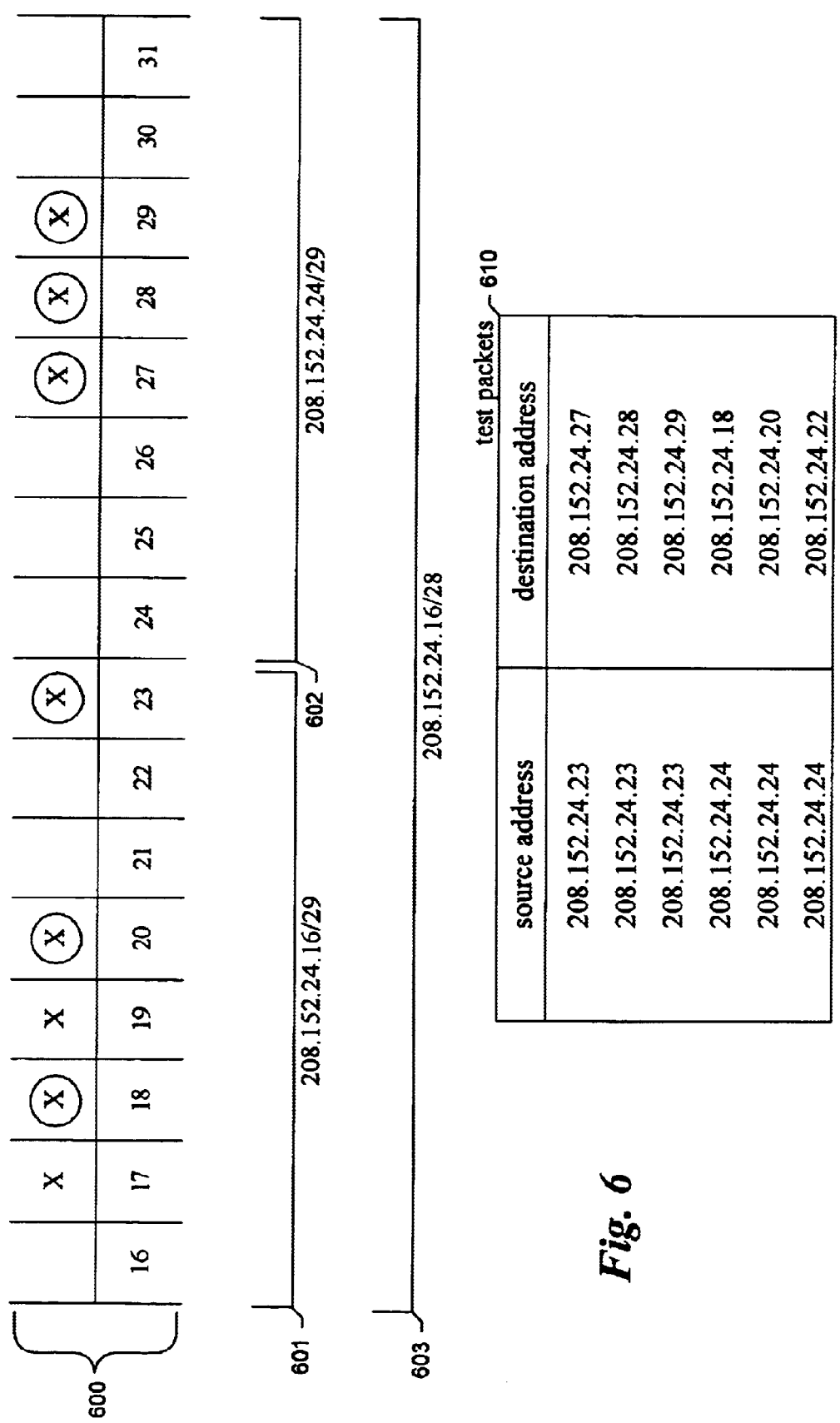
FIG. 6 is a network address diagram whose contents diverge from the subnet tree shown in FIG. 4.

For purposes of discussing the second test, FIG. 6 is a network address diagram whose contents diverge from the subnet tree shown in FIG. 4. In testing the analog of node 406 in the subtree to which FIG. 6 does correspond (not shown), the facility determines in the first test that the central addresses in range 603 are not host addresses. The facility, therefore, proceeds to the second test, in which it selects host addresses on both sides of range 603; that is, addresses in range 601 and addresses in range 602. In the example, the following host addresses are selected:

208.152.24.18

208.152.24.20

208.152.24.22

208.152.24.27

208.152.24.28

208.152.24.29

As shown in Table 610, the facility then sends test packets to each of these six host addresses. For host addresses in range 601, the test packets are preferably sent from the central address in range 602, 208.152.24.24. Similarly, for host addresses in range 602, the test packets are preferably sent from the central address in range 601, 208.152.24.23. Of these six test packets, the facility determines how many of them resulted in replies directly to the test packet source address. If this number exceeds a predetermined percentage such as 80%, then the node for range 603 is marked as a subnet node. Because hosts that are on different sides of subrange 603 attempt to communicate directly with each other rather than attempting to communicate through a router, these hosts consider them to be in the same subnet with hosts on the other side of the range, and must therefore be in such a subnet.

It will be understood by those skilled in the art that the above-described facility could be adapted or extended in various ways. For example, the facility could be straightforwardly adapted to operate on networks using various other addressing schemes. Also, the facility could employ additional techniques to identify host addresses. Further, the facility could be adapted to use different types of subnet trees, different traversal orders, or only one of the two tests. Additionally, the facility could be adapted to identify subnets without using a subnet tree. While the foregoing description makes reference to preferred embodiments, the scope of the invention is defined solely by the claims that follow and the elements recited therein.

I claim:

1. A method in a data processing system for identifying a subnet address range for a subnet being used in a network, the network utilizing addresses each comprising an ordered series of a fixed number of bits, comprising:
   (a) determining the addresses of a plurality of hosts within the network;
   (b) identifying an address prefix for which at least one determined host address has the form "<identified address prefix> 0 <any address suffix>", and for which at least one determined address has the form "<identified address prefix> 1 <any address suffix>";
   (c) determining whether the plurality of determined host addresses include either the address "<identified address prefix> 0 <address suffix comprised entirely of 1s>" or the address "<identified address prefix> 1 <address suffix comprised entirely of 0s>";
   (d) if the plurality of determined host addresses include either the address "<identified address prefix> 0 <address suffix comprised entirely of 1s>" or the address "<identified address prefix> 1 <address suffix comprised entirely of 0s>", identifying the range of addresses that all begin with the identified address prefix as a subnet address range for a subnet being used in a network;
   (e) if the plurality of determined host addresses include neither the address "<identified address prefix> 0 <address suffix comprised entirely of 1s>" nor the address "<identified address prefix> 1 <address suffix comprised entirely of 0s>":
      (1) sending one or more test packets requesting a reply each to a determined host address having the form "<identified address prefix> 0 <any address suffix>" from an address having the form "<identified address prefix> 1 <any address suffix>";
      (2) sending one or more test packets requesting a reply each to a determined host address having the form "<identified address prefix> 1 <any address suffix>" from an address having the form "<identified address prefix> 0 <any address suffix>";
      (3) determining the number of test pack sent where a reply to the test packet was sent directly from the test packet's destination address to the test packet's source address; and
      (4) if the number of test packets sent where a reply to the test packet was sent directly from the test packet's destination address to the test packet's source address exceeds a threshold number, identifying the range of addresses that all begin with the identified address prefix as identifying a subnet address range for a subnet being used in a network.

2. The method of claim 1, further comprising:
   (5) if the number of test packets sent where a reply to the test packet was sent directly from the test packet's destination address to the test packet's source address does not exceed a threshold number:
      (A) repeating steps (a)–(e)(5)(B) for address prefixes beginning with "<identified address prefix> 0"; and
      (B) repeating steps (a)–(e)(5)(B) for address prefixes beginning with "<identified address prefix> 1".

3. The method of claim 1, further comprising:
   generating a subnet tree data structure containing leaf nodes each representing a different determined host address, each leaf node having an ordered series of ancestor nodes that each represent an address prefix that is a prefix of the determined host address, the length of the address prefixes represented by the ancestor nodes decreasing as distance from the leaf node in the series of the ancestor nodes increases; and
   traversing the generated subnet tree to identify the address prefix.

4. The method of claim 1 wherein the network is an Internet Protocol network, and wherein the addresses are Internet Protocol addresses.

5. A method in a data processing system for identifying subnet address ranges for a subnets being used in a network, comprising:
   determining a plurality of addresses of hosts in the network;
   accessing a binary tree, the binary tree having a root node having no parents, parent nodes including the root node each having two child nodes, and leaf nodes having no children, such that the root node represents the entire range of addresses available in the network, such that each child node in a pair of child nodes represents a distinct half of the range represented by the parent node of the pair of child nodes, and such that each leaf node represents a single network address that is within the address ranges represented by all of the ancestors of the leaf node, each determined host address being represented by a leaf node;
   traversing the binary tree in preorder to identify candidate nodes, both child nodes of each candidate node having one or more descendant leaf nodes representing a determined host address;
   testing the address range represented by each visited candidate node to determine whether the address range is a subnet address range for a subnet being used in a network by, for the two subranges represented by the child nodes of the candidate node:
      sending one or more packets each from a source address to a destination address, each packet requesting a reply, the source and destination addresses being in different subranges for each packet,
      for each packet, determining whether a reply to the packet is sent directly from the destination address back to the source address, and
      if, for a number of packets exceeding a threshold number, a reply to the packet is sent directly from the destination address back to the source address, determining that the candidate node represents an address range that is a subnet address range for a subnet being used in a network;
   if testing indicates that a visited candidate node represents an address range that is a subnet address range for a subnet being used in a network, identifying the visited candidate node as a subnet node; and skipping, in the traversal, any candidate nodes that are descendants of a identified subnet node.

6. A method in a data processing system for identifying subnet address ranges for a subnets being used in a network, comprising:

determining a plurality of addresses of hosts in the network;

accessing a binary tree, the binary tree having a root node having no parents, parent nodes including the root node each having two child nodes, and leaf nodes having no children, such that the root node represents the entire range of addresses available in the network, such that each child node in a pair of child nodes represents a distinct half of the range represented by the parent node of the pair of child nodes, and such that each leaf node represents a single network address that is within the address ranges represented by all of the ancestors of the leaf node, each determined host address being represented by a leaf node;

traversing the binary tree in preorder to identify candidate nodes, both child nodes of each candidate node having one or more descendant leaf nodes representing a determined host address;

testing the address range represented by each visited candidate node to determine whether the address range is a subnet address range for a subnet being used in a network by, for the two subranges represented by the child nodes of the candidate node:

selecting the address within each subrange that is closest to the addresses of the other subrange, determining whether the network contains a host responding to either of the selected addresses, and if the network contains a host responding to either of the selected addresses, determining that the candidate node represents an address range that is a subnet address range for a subnet being used in a network;

if testing indicates that a visited candidate node represents an address range that is a subnet address range for a subnet being used in a network, identifying the visited candidate node as a subnet node; and skipping, in the traversal, any candidate nodes that are descendants of a identified subnet node.

7. A computer-readable medium whose contents cause a data processing system to identify subnet address ranges for a subnets being used in a network by:

receiving a plurality of addresses of hosts in the network;

accessing a binary tree, the binary tree having a root node having no parents, parent nodes including the root node each having two child nodes, and leaf nodes having no children, such that the root node represents the entire range of addresses available in the network, such that each child node in a pair of child nodes represents a distinct half of the range represented by the parent node of the pair of child nodes, and such that each leaf node represents a single network address that is within the address ranges represented by all of the ancestors of the leaf node, each received host address being represented by a leaf node;

traversing the binary tree in preorder to identify candidate nodes, both child nodes of each candidate node having one or more descendant leaf nodes representing a received host address;

testing the address range represented by each candidate node in the traversal visited to determine whether the address range is a subnet address range for a subnet being used in a network by, for the two subranges represented by the child nodes of the candidate node:

sending one or more packets each from a source address to a destination address, each packet requesting a reply, the source and destination addresses being in different subranges for each packet, for each packet, determining whether a reply to the packet is sent directly from the destination address back to the source address, and if, for a number of packets exceeding a threshold number, a reply to the packet is sent directly from the destination address back to the source address, determining that the candidate node represents an address range that is a subnet address range for a subnet being used in a network;

if testing indicates that a visited candidate node represents an address range that is a subnet address range for a subnet being used in a network, identifying the visited candidate node as a subnet node; and skipping, in the traversal, any candidate nodes that are descendants of a identified subnet node.

8. A computer-readable medium whose contents cause a data processing system to identify subnet address ranges for a subnets being used in a network by:

receiving a plurality of addresses of hosts in the network;

accessing a binary tree, the binary tree having a root node having no parents, parent nodes including the root node each having two child nodes, and leaf nodes having no children, such that the root node represents the entire range of addresses available in the network, such that each child node in a pair of child nodes represents a distinct half of the range represented by the parent node of the pair of child nodes, and such that each leaf node represents a single network address that is within the address ranges represented by all of the ancestors of the leaf node, each received host address being represented by a leaf node;

traversing the binary tree in preorder to identify candidate nodes, both child nodes of each candidate node having one or more descendant leaf nodes representing a received host address;

testing the address range represented by each candidate node in the traversal visited to determine whether the address range is a subnet address range for a subnet being used in a network by, for the two subranges represented by the child nodes of the candidate node:

selecting the address within each subrange that is closest to the addresses of the other subrange, determining whether the network contains a host responding to either of the selected addresses, and if the network contains a host responding to either of the selected addresses, determining that the candidate node represents an address range that is a subnet address range for a subnet being used in a network;

if testing indicates that a visited candidate node represents an address range that is a subnet address range for a subnet being used in a network, identifying the visited candidate node as a subnet node; and skipping, in the traversal, any candidate nodes that are descendants of a identified subnet node.

9. A method in a data processing system for determining whether a selected range of addresses in a network is entirely within a subnet, comprising:

identifying two subranges within the range;

sending one or more packets each from a source address to a destination address, each packet requesting a reply, the source and destination addresses being in different subranges for each packet;

for each packet, determining whether a reply to the packet is sent directly from the destination address back to the source address; and if, for a number of packets exceeding a threshold number, a reply to the packet is sent directly from the destination address back to the source address, determining that the range of addresses is entirely within a subnet.

10. The method of claim 9, wherein the identifying identifies contiguous, mutually exclusive subranges each containing half as many addresses as the range.

11. A computer-readable medium whose contents cause a data processing system to determining whether a selected range of addresses in a network is entirely within a subnet by:

dividing the range into two subranges;

sending one or more packets each from a source address to a destination address, each packet requesting a reply, the source and destination addresses being in different subranges for each packet;

for each packet, determining whether a reply to the packet is sent directly from the destination address back to the source address; and if, for a number of packets exceeding a threshold number, a reply to the packet is sent directly from the destination address back to the source address, determining that the range of addresses is entirely within a subnet.

12. A data processing system for determining whether a selected range of addresses in a network is entirely within a subnet, comprising:

a range identification subsystem that identifies two subranges within the range;

a packet transmission subsystem that sends one or more packets each from a source address to a destination address, each packet requesting a reply, the source and destination addresses being in different subranges for each packet;

a reply monitoring subsystem that, for each packet, determines whether a reply to the packet is sent directly from the destination address back to the source address; and a result determination subsystem that determines that the range of addresses is entirely within a subnet if, for a number of packets exceeding a threshold number, a reply to the packet is sent directly from the destination address back to the source address.

13. A method in a data processing system for determining whether a selected range of addresses in a network is entirely within a subnet, comprising:

dividing the range into two subranges;

within each subrange, selecting one address;

determining whether the network contains a device responding to either of the selected addresses; and if the network contains a device responding to either of the selected addresses, determining that the range of addresses is entirely within a subnet.

14. The method of claim 13 wherein the identifying identifies contiguous, mutually exclusive subranges each containing half as many addresses as the range, and wherein the selecting selects the address in each subrange that is closest to the addresses of the other subrange.

15. A computer-readable medium whose contents cause a data processing system to determine whether a selected range of addresses in a network is entirely within a subnet, comprising:

identifying two subranges within the range;

within each subrange, selecting one address;

determining whether the network contains a device responding to either of the selected addresses; and if the network contains a device responding to either of the selected addresses, determining that the range of addresses is entirely within a subnet.

16. A data processing system for determining whether a selected range of addresses in a network is entirely within a subnet, comprising:

a range identification subsystem that identifies two subranges within the range;

an address selection system that selects one address within each subrange;

a network device sensing subsystem that determines whether the network contains a device responding to either of the selected addresses; and a result determination subsystem that determines that the range of addresses is entirely within a subnet if the network contains a device responding to either of the selected addresses.

* * * * *

UNITED STATES PATENT AND TRADEMARK OFFICE
CERTIFICATE OF CORRECTION

PATENT NO.    : 6,618,755 B1
DATED         : September 9, 2003
INVENTOR(S)   : David Wayne Bonn It is certified that error appears in the above-identified patent and that said Letters Patent is hereby corrected as shown below:

Column 7,
Line 60, "pack" should be -- packet --.

Signed and Sealed this

First Day of November, 2005

JON W. DUDAS
*Director of the United States Patent and Trademark Office*